United States Patent
Tanii et al.

(10) Patent No.: US 11,621,584 B2
(45) Date of Patent: Apr. 4, 2023

(54) WIRELESS POWER-FEEDING APPARATUS

(71) Applicants: MAXELL, LTD., Kyoto (JP); MIZUNO CORPORATION, Osaka (JP); AICHI STEEL CORPORATION, Tokai (JP); SUNWISE CO., LTD., Osaka (JP)

(72) Inventors: Keiichi Tanii, Kyoto (JP); Takeshi Naruo, Osaka (JP); Shohei Shibata, Osaka (JP); Masaki Mori, Tokai (JP); Michiharu Yamamoto, Tokai (JP); Yasushi Senda, Osaka (JP)

(73) Assignees: MAXELL, LTD., Kyoto (JP); MIZUNO CORPORATION, Osaka (JP); AICHI STEEL CORPORATION, Tokai (JP); SUNWISE CO., LTD., Osaka (JP)

( * ) Notice: Subject to any disclaimer, the term of this patent is extended or adjusted under 35 U.S.C. 154(b) by 405 days.

(21) Appl. No.: 16/771,593

(22) PCT Filed: Jan. 29, 2019

(86) PCT No.: PCT/JP2019/002914
§ 371 (c)(1),
(2) Date: Jun. 10, 2020

(87) PCT Pub. No.: WO2019/151225
PCT Pub. Date: Aug. 8, 2019

(65) Prior Publication Data
US 2020/0303958 A1 Sep. 24, 2020

(30) Foreign Application Priority Data
Feb. 2, 2018 (JP) .............................. JP2018-017591

(51) Int. Cl.
*H02J 50/80* (2016.01)
*H02J 50/12* (2016.01)
(Continued)

(52) U.S. Cl.
CPC .............. *H02J 50/12* (2016.02); *H01F 38/14* (2013.01); *H02J 7/02* (2013.01); *H02J 50/80* (2016.02); *H02J 50/90* (2016.02); *A63B 2225/50* (2013.01)

(58) Field of Classification Search
CPC ........ A63B 2225/50; H01F 38/14; H02J 7/02; H02J 50/12; H02J 50/80; H02J 50/90
(Continued)

(56) References Cited

U.S. PATENT DOCUMENTS

| 10,076,685 B2 * | 9/2018 | King ........................ H02J 50/90 |
| 2016/0001136 A1 | 1/2016 | King et al. |

(Continued)

FOREIGN PATENT DOCUMENTS

| JP | 2005-81128 A | 3/2005 |
| JP | 2008-206295 A | 9/2008 |

(Continued)

OTHER PUBLICATIONS

Mar. 19, 2019 International Search Report issued in International Patent Application No. PCT/JP2019/002914.
(Continued)

*Primary Examiner* — William Hernandez
(74) *Attorney, Agent, or Firm* — Oliff PLC

(57) ABSTRACT

A wireless power-feeding apparatus that enables efficient wireless feeding to a power-receiving coil embedded at the center of a spherical power-receiving device. The apparatus includes: a holding member for holding the power-receiving device; a power-transmitting coil; a driver circuit for supplying the power-transmitting coil with high-frequency cur-
(Continued)

rent to generate a magnetic flux for wireless power-feeding to the power-receiving coil; and a wireless data receiver for receiving data transmitted regularly from a wireless data transmitter, the power-transmitting coil being positioned relative to the holding member in such a manner that the axes of the power-receiving coil and the power-transmitting coil are parallel to each other when the power-receiving device is held by the holding member in such a manner that a mark provided on the surface of the power-receiving device faces a predetermined direction.

10 Claims, 8 Drawing Sheets

(51) Int. Cl.
   *H02J 50/90* (2016.01)
   *H01F 38/14* (2006.01)
   *H02J 7/02* (2016.01)
(58) Field of Classification Search
   USPC .......................................................... 320/108
   See application file for complete search history.

(56) References Cited

U.S. PATENT DOCUMENTS

| 2017/0018973 A1 | 1/2017 | Murayama et al. |
| 2018/0021630 A1 | 1/2018 | Monnin et al. |

FOREIGN PATENT DOCUMENTS

| JP | 2014-093884 A | 5/2014 |
| JP | 2015-231258 A | 12/2015 |
| WO | 2014/008202 A1 | 1/2014 |
| WO | 2017/016376 A1 | 2/2017 |

OTHER PUBLICATIONS

"Joint Development With Mizuno of an Internal Baseball Sensor Module Using The MI SENSOR". News Release, Sep. 4, 2017, Aichi Steel Corporation.
"Prototype of Baseball Rotation Analysis System 'MAQ' (MAKYU) Completed". Mizuno News Release, Sep. 4, 2017.

\* cited by examiner

WIRELESS POWER-FEEDING APPARATUS

TECHNICAL FIELD

The present invention relates to a wireless power-feeding apparatus for supplying electric power to a spherical power-receiving device, e.g., in the form of a baseball.

BACKGROUND ART

The present applicants are engaged in the development of measurement devices in the form of a baseball incorporating dedicated sensors at its center (such a device constitutes a power-receiving device). When a pitcher throws a ball constituting such a ball-shaped measurement device, the device is capable of measuring, for example, ball spin rate, ball spin axis, and ball velocity, and thus enabling analysis of the measurement data to visualize characteristics of a ball thrown by the pitcher, such as "straightness of a four-seam fastball" or "sharpness of a breaking ball", thereby supporting his training with enhanced precision.

To ensure that the behavior of a thrown ball or the feel during a pitch are substantially the same as those of a real regulation baseball, it is preferable that all the components of the measurement device be incorporated in a capsule embedded in a regulation baseball at its core and the entire device have the same construction as a real regulation baseball except for the core.

In other words, it is preferable that the rubber core of a real regulation baseball be replaced by such a capsule as described above: woolen and/or cotton yarn is wound around such a capsule in the same manner as for a real regulation baseball, and wrapped by two white cover pieces made of horsehide or cowhide, which are then firmly stitched together at their joint.

In the case of such a periphery construction similar to that of a real regulation baseball, charging terminals for the incorporated battery cell cannot be provided on the outer surface; in view of this, the present applicants have been attempting to create an arrangement where a small coin-shaped or button-shaped secondary cell, working as a power supply for the ball-shaped measurement device, is incorporated in such a capsule as discussed above and a power-receiving coil and a charging circuit for wireless power-feeding are incorporated in the capsule to enable the secondary cell to be charged repeatedly through wireless power-feeding.

A known ball-shaped device that enables wireless power-feeding is the golf ball disclosed by Patent Document 1, for example, listed below. This golf ball, representing a conventional power-receiving device, incorporates an electronic tag (2) including memory, a microprocessor and an antenna coil (i.e., power-receiving coil), and a power storage element (3), where the power storage element can be charged using a non-contact charger (17). That is, this non-contact charger includes a bowl-shaped golf-ball holder (18) on which a golf ball can be placed, and a primary coil is incorporated in the bottom portion of the holder to generate a magnetic flux, which is received by the antenna coil incorporated in the golf ball, which in turn works as a transformer to produce a secondary output, with which the storage element is charged.

PRIOR ART DOCUMENTS

Patent Documents

Patent Document 1: JP 2005-81128 A

SUMMARY OF THE INVENTION

Problems to be Solved by the Invention

The electronic tag incorporated in the above-discussed conventional golf ball requires a very small power consumption, and the storage element has a storage capacity that is small enough for being charged even by electric current generated in the antenna coil upon a tee shot of the golf ball on a magnetic tee peg; consequently, the element can be sufficiently charged by the primary coil provided in the bottom portion of a bowl-shaped golf-ball holder.

It is known that, during wireless power-feeding through electromagnetic induction, an axial gap between the primary and secondary coils significantly decreases power-feed efficiency; it is technical common knowledge that this gap should be less than about 1 cm. If an antenna coil is incorporated at the center of a ball, the gap between the primary coil provided in the bottom portion of the holder and the antenna coil at the center of the ball is substantially equal to the radius of the ball. Since a golf ball has a diameter of 4 cm or larger, the above-discussed conventional art entails a gap of about 2 cm between the primary coil and antenna coil, which obviously allows feeding of very small but sufficient power for charging the storage element.

Meanwhile, a baseball-shaped measurement device, such as ones being developed by the present applicants, incorporates a microprocessor that performs relatively advanced information processing to enable measurement of, for example, ball spin rate, ball spin axis, and ball velocity, as well as a communication circuit for wireless communication of measurement data via communications with a smartphone; a charge of a lithium secondary cell incorporated to work as a power supply for driving such a microprocessor or communication circuit requires significantly more electric power than for the above-discussed conventional technique to be transmitted in wireless feeding.

Further, a power-receiving coil has a polarity derived from its winding direction; thus, to increase wireless-feed efficiency, it is preferable that the direction of the axis of the transmission coil (i.e., primary coil) in the charger (i.e., wireless power-feeding apparatus) be aligned with the direction of the axis of the power-receiving coil. However, if a ball is manufactured by a process including the step of winding woolen and cotton yarn around the capsule of the core to achieve the same outer-layer construction as for a real regulation baseball, a look at the ball from outside does not enable determining in which direction the embedded power-receiving coil is positioned; since the positional relationship between the two cover pieces and the power-receiving coil cannot be recognized during stitching, the relationship between the stitch lines appearing on the outer surface of the ball and the power-receiving coil is irregular, making it impossible to determine the polarity of the power-receiving coil by looking at the outside, which in tern makes it impossible to determine how to position the ball on the charger to improve feed efficiency.

In view of these and other problems, an object of the present invention is to provide a wireless power-feeding apparatus that enables efficient wireless feeding to a power-receiving coil embedded at the center of a spherical power-receiving device.

Means for Solving the Problems

A wireless power-feeding apparatus according to the present disclosure supplies electric power to a spherical power-receiving device. The power-receiving device incorporates a secondary cell, a power-receiving coil, a charging circuit and a wireless data transmitter. Preferably, the surface of the power-receiving device is provided with a predetermined mark at a predetermined location relative to the power-receiving coil.

The wireless power-feeding apparatus includes a power-transmitting coil; a driver circuit adapted to supply the power-transmitting coil with high-frequency current to generate a magnetic flux for wireless power-feeding to the power-receiving coil; and a wireless data receiver adapted to receive data transmitted regularly from the wireless data transmitter. The wireless power-feeding apparatus may further include a holding member adapted to hold the power-receiving device. Furthermore, the wireless power-feeding apparatus may further include a notifier adapted to provide a predetermined notification depending on the data received by the wireless data receiver.

Preferably, the power-transmitting coil is positioned relative to the holding member in such a manner that axes of the power-receiving coil and the power-transmitting coil are parallel to each other when the power-receiving device is held by the holding member in such a manner that the mark on the surface of the power-receiving device faces a predetermined direction.

Preferably, the data received by the wireless data receiver includes information relating to a state of feed for the power-receiving coil, where the notifier may be configured to change its notification depending on a change in the state of feed.

Preferably, the power-transmitting coil is a solenoid coil having a diameter larger than an outer diameter of the power-receiving device and having an axial length.

Effects of the Invention

The wireless power-feeding apparatus of the present invention allows an easy operation to let the power-receiving device be held so as to provide an appropriate positional relationship between the power-transmitting coil and power-receiving coil, thereby further improving feed efficiency.

EMBODIMENTS FOR CARRYING OUT THE INVENTION

Figure 1:
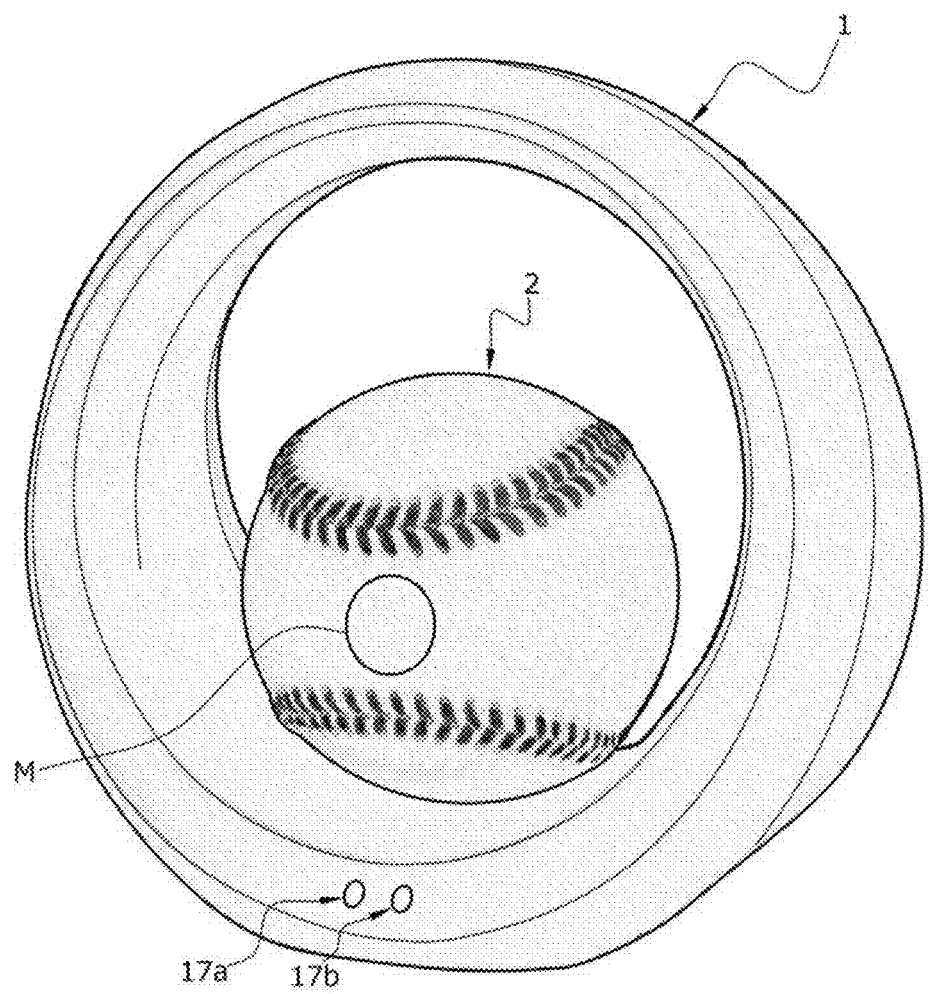
FIG. 1 is a perspective view of a charger constituting a wireless power-feeding apparatus according to a first embodiment of the present invention, with a ball-shaped measurement device constituting a power-receiving device held thereby.

The wireless power-feeding apparatus according to the present disclosure supplies electric power to a spherical power-receiving device, where the spherical power-receiving device may incorporate a secondary cell, a power-receiving coil, a charging circuit and a wireless data transmitter. The power-receiving device may have various applications and constructions, and may be a measurement device in the form of a baseball incorporating dedicated sensors at its center, for example. This ball-shaped measurement device may have a construction in which a capsule is embedded in a regular baseball at its core and measurement device components are incorporated within this capsule. The measurement device components may suitably include a power-receiving coil constituted by a solenoid coil having an axial length, a coin-shaped or button-shaped secondary cell inside the inner periphery of the power-receiving coil, a charging circuit for charging the secondary cell with electric power received by the power-receiving coil, a wireless data transmitter for transmitting data including various information relating to the state of feed for the power-receiving coil and/or state of charge of the secondary cell, a sensor for detecting, for example, ball spin rate, ball spin axis and/or ball velocity, a calculation unit for performing various calculations for recording/measuring and/or analyzing the data from detection by the sensor, and a wireless communication circuit for wirelessly transmitting the result of calculation by the calculation unit to an external device such as a smartphone using an appropriate protocol, such as Bluetooth (registered trademark) or Wi-Fi (registered trademark). Preferably, the portions of the ball other than the core may have the same construction as a real regulation baseball so as to exhibit the same behavior and give the same feel during a pitch as a real regulation baseball when the ball is thrown.

Preferably, the surface of the spherical power-receiving device may be provided with a predetermined mark at a predetermined location relative to the power-receiving coil, for example at the intersection of the axis of the power-receiving coil and the surface. In the case of a baseball-shaped measurement device, this mark may be a logo provided on the surface of the cover by an appropriate method, such as printing or stitching. Further, the mark may be at a location that allows estimating where the intersection of the coil axis and the surface is. Further, the mark may be aligned with a mark provided on the wireless power-feeding apparatus. Alternatively, the mark may be substituted by a stitch of the cover pieces of the ball or a stitch decoration on the ball surface. If a wireless power-feeding system is constructed by a power-receiving device used as a regulation baseball or a leather softball and the above-discussed wireless power-feeding apparatus, the mark may be a stitch of the cover pieces of the regulation baseball or leather softball. If a wireless power-feeding system is constructed by a power-receiving device used as a rubber baseball or a rubber softball and the above-discussed wireless power-feeding apparatus, the mark may be a stitch decoration on the surface of the rubber baseball or rubber softball.

Further, the wireless data transmitter of the power-receiving device may be constituted by a separate communication circuit electrically separated from the power-receiving coil; still, to realize a simple and compact circuit configuration, it is preferably to provide a circuit construction that uses binary ASK modulation, where the impedance of a resonance circuit including the power-receiving coil is modulated, to perform unidirectional communication from the power-receiving device to the wireless power-feeding apparatus. The wireless data transmitter may operate using electric power received by the power-receiving coil, and may be configured to regularly transmit packets including predetermined information while the power-receiving coil is receiving power. The information to be transmitted may be designed as appropriate, and may include information relating to, for example, the amount of power being received (i.e., information relating to the state of feed), the required amount of power or the difference between the required amount of power and the amount of power being currently received, a request for stopping power transmission, and/or the level of charge of the secondary cell (i.e., information relating to the state of charge), and may further include the type information of the power-receiving device or information specific to the device, for example.

The wireless power-feeding apparatus according to the present disclosure may include a holding member for holding a spherical power-receiving device. The apparatus may include a first holding member for holding a first power-receiving device with a relatively small diameter (for example, the size of a regulation baseball) and a second holding member for holding a second power-receiving device with a relatively large diameter (for example, the size of a softball). This will allow a spherical power-receiving device to be held on the wireless power-feeding apparatus without rolling out of it.

Further, the wireless power-feeding apparatus according to the present disclosure may include a power-transmitting coil, a driver circuit adapted to supply the power-transmitting coil with high-frequency current to generate a magnetic flux for wireless feeding to the power-receiving coil, a wireless data receiver adapted to receive data transmitted by the wireless data transmitter, and a notifier adapted to provide a predetermined notification depending on the data received by the wireless data receiver.

While the power-transmitting coil may be a spiral planar coil, it is preferable that it be constituted by a solenoid coil having an axial length. In any case, it is preferable that the inner diameter of the power-transmitting coil is larger than the outer diameter of the power-receiving device such that the power-receiving device can be positioned within the power-transmitting coil.

The driver circuit may have any circuit configuration, and may be implemented using a commercial driver IC; typically, it is constituted by a half-bridge or full-bridge inverter. The frequency of high-frequency current is preferably matched to the resonance frequency of the resonance circuit including the power-receiving coil of the power-receiving device. It has been found that a feature of a resonance circuit is to have a parallel-resonance frequency, where the impedance is the largest, and a series-resonance frequency, where the impedance is the smallest; preferably, the frequency of high-frequency current is matched to the series-resonance frequency. Further, if resonance frequency varies as the distance and/or angle between the power-transmitting and power-receiving coils and other factors change, the circuit may be configured such that the frequency of high-frequency current automatically changes to follow the changes in the resonance frequency of the power-receiving device.

The wireless data receiver may be any means adapted to the configuration of the wireless data transmitter of the power-receiving device; if the wireless data transmitter is configured to perform binary ASK modulation using variations in a load in the power-receiving device, as discussed above, the wireless data receiver may be constituted by a wave detection circuit that detects the waveform of a received signal superimposed on the high-frequency current flowing through the power-transmitting coil, and may be configured such that the serial data obtained through waveform detection is provided to the notifier.

The notifier provides a predetermined notification depending on the information included in the data received, and may include a notification processing unit including a microprocessor with a notification processing program, and a notification unit including an LED or a buzzer driven and controlled by the notification processing unit. The data transmitted by the wireless data transmitter of the power-receiving device may include information relating to the state of feed for the power-receiving coil, such as the amount of power being received, and the notifier may be configured to modify the notification as the state of feed changes. For example, the notification processing unit may be configured to increase or decrease the rate of flickering of the LED depending on the ratio of the amount of power being received to the amount of power being transmitted to notify the user whether the power-receiving device is appropriately positioned relative to the power-transmitting coil of the wireless power-feeding apparatus.

The wireless power-feeding apparatus according to the present disclosure may further include a power supply voltage adjustment controller adapted to adjust a power supply voltage in the driver circuit (i.e., power supply voltage of high-frequency current being supplied to the power-transmitting coil) such that the amount of power being transmitted can be adjusted in response to a request from the power-receiving device (for example, information relating to the required amount of power included in the data transmitted by the wireless data transmitter of the power-receiving device). The power supply voltage adjustment controller may have any configuration, and may be constituted by, for example, a voltage control unit including a microprocessor and a voltage conversion circuit for converting a main supply voltage provided by a main supply circuit of the wireless power-feeding apparatus to a voltage indicated by the voltage control unit to provide it to the driver circuit, where this voltage represents the power supply voltage of high-frequency current. The voltage conversion circuit may be a DC/DC converter or a variable constant-voltage regulator. The DC/DC converter may be an up/down converter capable of outputting voltages ranging from a minimum voltage lower than the main supply voltage to a maximum voltage higher than the main supply voltage. While it is preferable that the voltage control unit and notification processing unit be constituted by a common microprocessor, they may be constituted by separate microprocessors.

The power supply voltage adjustment controller, more preferably the voltage control unit, may be capable of selectively performing a first control mode, in which the notifier performs a predetermined notification, and a second control mode, in which the secondary cell of the power-receiving device is to be fully charged. Such selection of a control mode may be done by a predetermined operation of an operation unit provided on the wireless power-feeding apparatus; alternatively, the first control mode may be performed during a predetermined period of time at the beginning of a charge and, thereafter, the second control mode may be automatically performed.

During an operation in the first control mode, the voltage control unit may be configured to control the voltage conversion circuit such that a relatively low constant voltage is supplied to the driver circuit, and the notifier may be configured to perform a notification operation depending on the changing state of feed during the operation in the first control mode. Thus, changes in the position of the power-receiving coil relative to the power-transmitting coil, particularly changes in the relative angle between the axes of the two coils, will cause relatively significant variations in the amount of power being received, making it possible to adjust the power-receiving device in a simple manner by rotating it based on the notification by the notifier such that the power-receiving coil embedded in the spherical power-receiving device is in a more appropriate position relative to the power-transmitting coil.

On the other hand, during an operation in the second control mode, the output voltage in the voltage conversion circuit (i.e., power supply voltage of high-frequency current) may be changed within a predetermined range depending on the state of charge of the secondary cell such that the secondary cell can be charged with an appropriate charging profile. While any charging profile may be used, a CCCV profile may be used to reduce the charging time and to prevent deterioration of the battery cell.

The output voltage in the voltage conversion circuit during the operation in the first control mode is preferably a constant voltage lower than the maximum voltage of the range in which the output voltage in the voltage conversion circuit can be regulated during the operation in the second control mode, and more preferably a constant voltage lower than the intermediate level of that voltage regulation range. For example, if the regulation range during the operation in the second control mode is 1 to 7 V, a constant voltage of 3 V may be supplied as a power supply voltage to the driver circuit during the operation in the first control mode.

Further, the wireless power-feeding apparatus according to the present disclosure allows the power-transmitting coil to be positioned relative to the holding member in such a manner that the axes of the power-receiving coil and power-transmitting coil are parallel to each other when the power-receiving device is held by the holding member in such a manner that the mark on the surface of the power-receiving device faces a predetermined direction, such as toward the front. Thus, the user can easily position the power-receiving coil and power-transmitting coil in an appropriate positional relationship by looking at the mark on the surface of the power-receiving device and placing the device on the holding member of the wireless power-feeding apparatus in such a manner that the mark faces a predetermined direction. "The axes of the power-receiving coil and power-transmitting coil being parallel to each other" includes a situation where their axes are matched. Further, in actual use, the power-receiving device may be held by the holding member in such a manner that the mark faces a direction somewhat displaced from the predetermined direction (for example, obliquely upward, obliquely downward or obliquely to the left or right), resulting in some angle between the axes of the power-receiving coil and power-transmitting coil; the apparatus may be configured to perform the power-feeding operation even in such a situation as long as feeding is possible. For example, the apparatus may perform the wireless feeding operation where a relative angle between the axes of the power-receiving and power-transmitting coils within the range of about −30° to +30° is permissible.

More preferably, the power-transmitting coil may be positioned relative to the holding member in such a manner that the power-receiving coil and the power-transmitting coil overlap at least partially as viewed in a radial direction when the power-receiving device is held by the holding member in such a manner that the axes of the power-receiving coil and the power-transmitting coil are parallel to each other. In such implementations, when the power-receiving device is held by the holding member in such a manner that the mark faces a predetermined direction, the power-receiving coil and power-transmitting coil having predetermined axial lengths overlap each other, leading to closer magnetic coupling between the two coils, thereby further improving feed efficiency.

Now, embodiments of the present disclosure will be described with reference to the drawings. FIGS. 1 to 5 show a charger 1, which works as an electromagnetic induction-type wireless power-feeding apparatus, and a ball-shaped measurement device 2, which works as a power-receiving device, according to a first embodiment of the present invention. The charger 1 and measurement device 2 constitute a wireless power-feeding system.

[Construction of Measurement Device]

Figure 4:
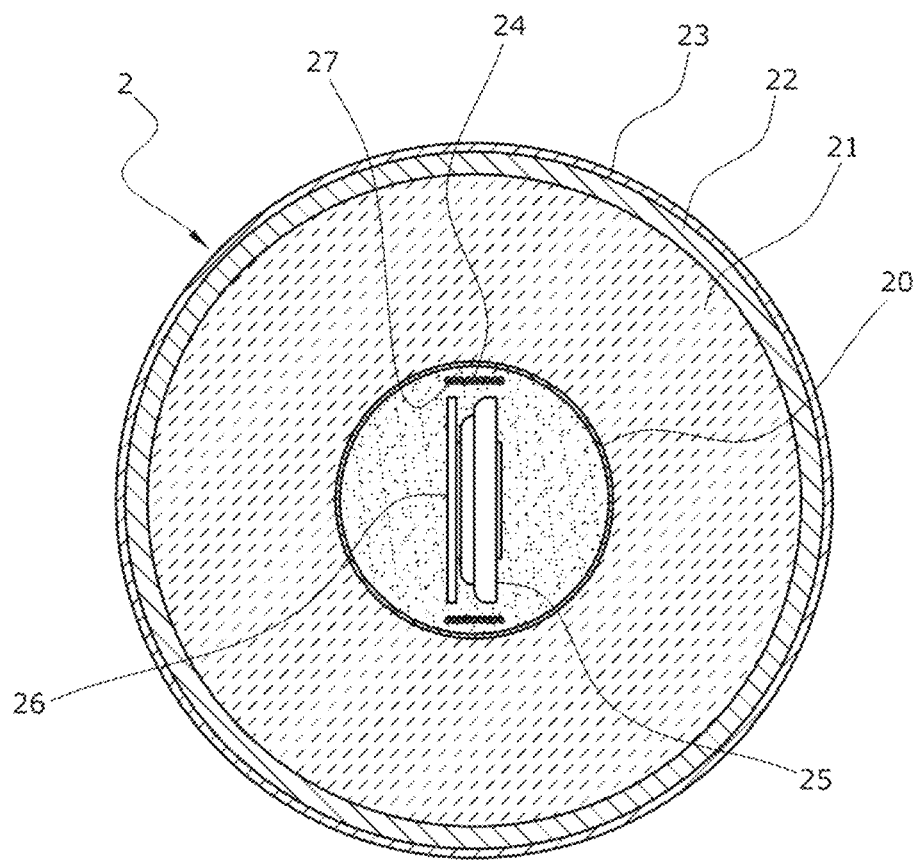
FIG. 4 is a cross-sectional view of the baseball-shaped measurement device of FIG. 1 as viewed from a side.

First, the construction of the measurement device 2 will be described with reference to FIG. 4. The ball-shaped measurement device 2 according to the present embodiment is manufactured in the following manner: the core of a regulation baseball is replaced by a spherical capsule 20 embedded therein and incorporating electronic components that constitute the measurement device; similar to a real regulation baseball, woolen yarn 21 and cotton yarn 22 are wound around the outer surface of the capsule 20; the outer surface is wrapped by two white cover pieces 23 made of horsehide or cowhide; and the joint between the two cover pieces 23 is firmly stitched together.

The capsule 20 incorporates a power-receiving coil 24, a coin-shaped lithium secondary cell 25, a control board 26, and a magnetic sheet 27 attached to the inner periphery of the power-receiving coil 24. The power-receiving coil 24 is a solenoid coil having an axial length that is generally equal to or slightly larger than the thickness of the secondary cell 25, and is wound to form a circle as viewed in the axial direction. Since the power-receiving coil 24 has a predetermined axial length, the magnetic sheet 27, which is shaped to be cylindrical to cover the outer periphery of the secondary cell 25, can be attached to the coil in a stable manner. The diameters of the power-receiving coil 24 and magnetic sheet 27 are smaller than the inner diameter of the capsule 20 and larger than the outer diameter of the secondary cell 25. The control board 26 may be circular in shape as viewed in the axial direction, and has a diameter generally equal to the diameter of the secondary cell 25. The capsule 20 is filled with a filler such as silicone gel to fix the power-receiving coil 24, secondary cell 25 and control board 26 to prevent them from moving within the capsule 20.

Figure 5:
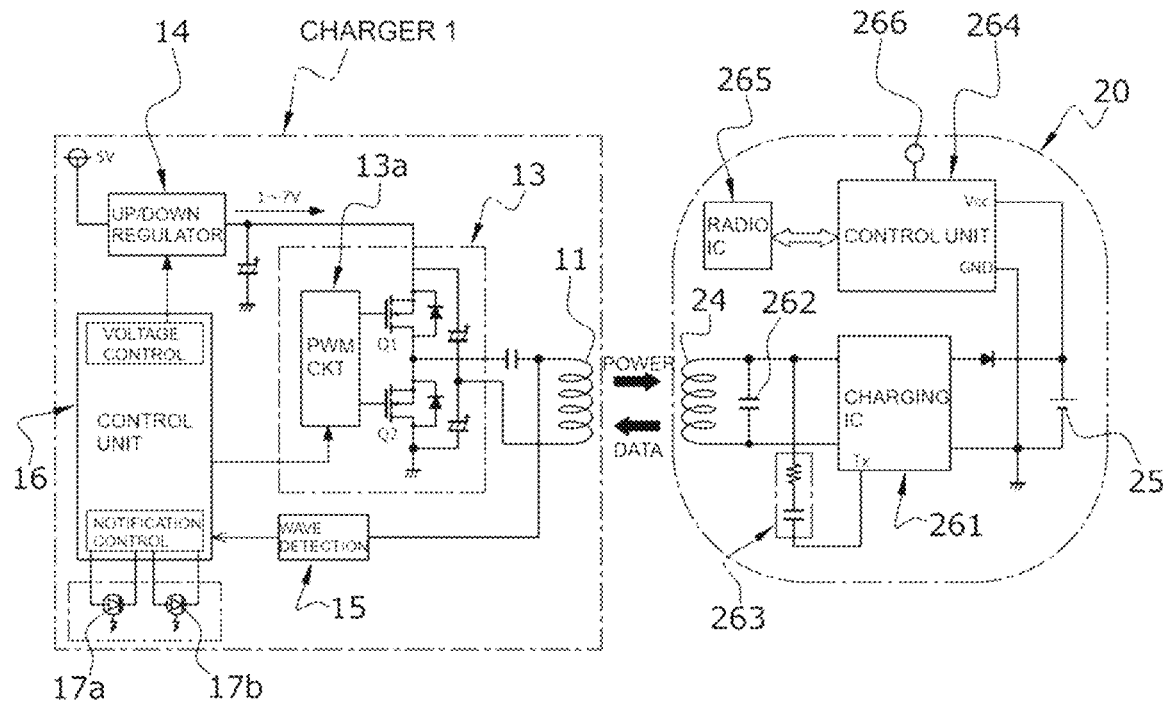
FIG. 5 is a simplified circuit diagram of the charger and baseball-shaped measurement device of FIG. 1.

As shown in FIG. 5, on the control board 26 are mounted: a charging IC 261 (i.e., charging circuit) for charging the secondary cell 25 with electric power received by the reception coil 24; a capacitor 262 that, together with the power-receiving coil 24, constitutes a parallel-resonance circuit; a load circuit 263 (i.e., wireless data translation means) for changing the impedance of the resonance circuit; a control unit 264 constituted by, among other components, a microprocessor that operates using power supplied by the secondary cell 25; a radio IC 265 (i.e., wireless communication circuit) for bidirectional wireless communication with an external portable electronic device such as a smartphone; and sensors 266 for detecting, for example, ball spin rate, ball spin axis, and ball velocity when the ball-shaped measurement device 2 is thrown. Alternatively, the capacitor 262 may be connected in series with the power-receiving coil 24 to provide a series-resonance circuit.

The charging IC 261 operates using power received by the power-receiving coil 24; when power supply is initiated, the IC starts controlling the charge operation of the secondary cell 25 in accordance with a predetermined charging profile. It is preferable that the charging profile is a CCCV profile, where a constant-current charge is performed at the beginning of the charge before a constant-voltage charge is performed to increase the charge rate while minimizing deterioration of the secondary cell 25.

Further, while controlling the charge operation, the charging IC 261 provides a binary signal to the load circuit 263 so that the circuit can regularly transmit packet data including predetermined information to the charger 1. The packet data to be transmitted may include information relating to the state of feed for the power-receiving coil 24 (e.g., amount of power being received), the state of charge of the secondary cell 25 (e.g., level of charge), the amount of power currently required to charge the secondary cell 25 in accordance with the charging profile (or difference between the required amount of power and the amount of power being currently received), the temperature of the secondary cell 25, error information obtained through detection by the charging IC 261, and various other information or commands, such as a request for stopping power transmission. This packet data may have about 80 to 100 bits, for example. When the charging IC 261 provides a binary signal to the load circuit 263, a binary ASK modulation signal is superimposed on the waveform of current flowing through the power-receiving coil 24, and the modulated signal is transmitted to the power-transmitting coil 11 by means of electromagnetic interaction. Thus, unidirectional wireless data communication to the charger 1 is established by the charging IC 261 and load circuit 263.

It is possible to provide an arrangement where antenna coils separate from the power-transmitting coil 11 and power-receiving coil 24 are incorporated in the charger 1 and measurement device 2, respectively, so that such packet data as discussed above can be exchanged through these antenna coils; however, to simplify the hardware configuration, the circuit configuration shown in FIG. 5 is preferable.

Based on signals obtained through detection by the sensors 26, the control unit 264 measures and analyzes ball spin rate, ball spin axis, and ball velocity of the ball-shaped measurement device 2 as thrown, and stores the results in the memory. Further, when the control unit receives a communication request from an external device via the radio IC 265, the unit transmits, in accordance with the request, the stored measurement and analysis results to the external device via the radio IC 265.

Further, the outer surface of the cover 23 of the ball-shaped measurement device 2 is provided with a mark M at the intersection of the cover and the axis of the embedded power-receiving coil 24, and the ball-shaped measurement device 2 can be placed on the charger 1 in such a manner that the mark M faces toward the front, resulting in the axis of the power-receiving coil 24 being parallel to the axis of the power-transmitting coil 11 of the charger 11. Such a mark M may be provided by the following method: in the process for manufacturing the ball-shaped measurement device 2, following the winding of the cotton yarn 22 and prior to the stitching of the cover 23, the charger 1 according to the present embodiment or a tester 1' according to a second embodiment, discussed further below, may be used to detect the direction of the axis of the power-receiving coil 24 embedded within, and the cover 23 provided with the mark M may be stitched in such a manner that the mark M is located at the determined axis position.

[Construction of Charger]

The construction of the charger 1 working as the wireless power-feeding apparatus according to the present embodiment will be described in detail below.

Figure 2:
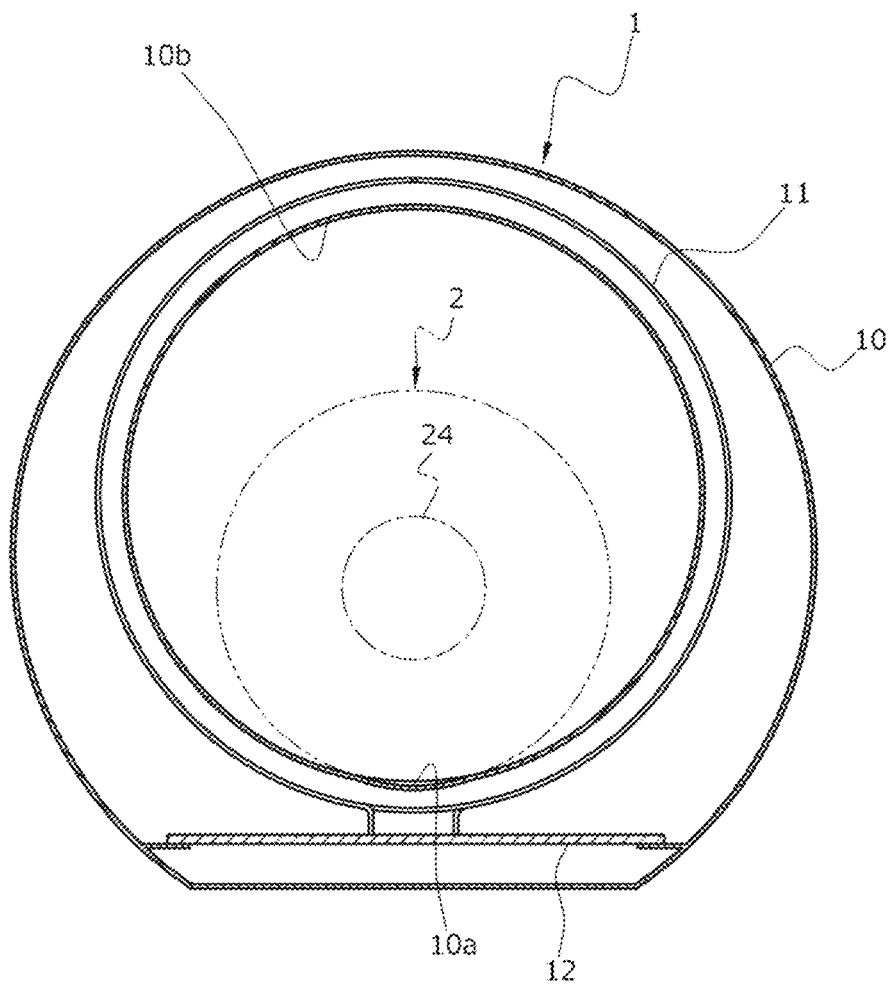
FIG. 2 is a cross-sectional view of the charger of FIG. 1 as viewed from the front.
Figure 3:
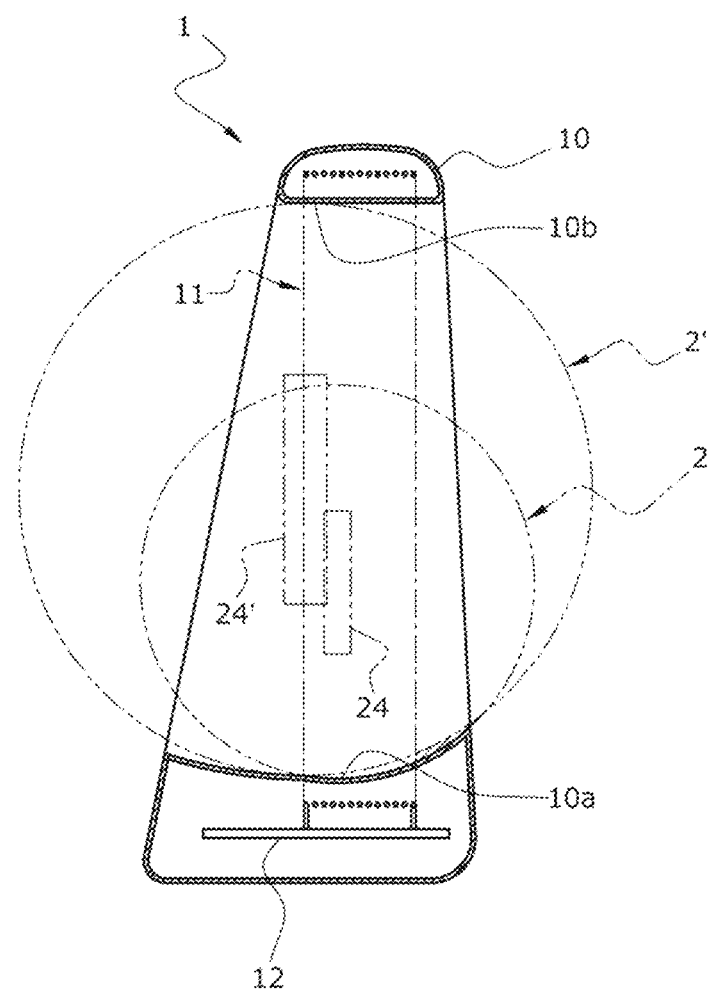
FIG. 3 is a cross-sectional view of the charger of FIG. 1 as viewed from a side.

As shown in FIGS. 1 to 3, the charger 1 includes a housing 10 that has a hollow cross section and is ring-shaped as a whole, and the housing 10 incorporates the power-transmitting coil 11 along the entire circumference of the housing ring, constituted by a solenoid coil having a predetermined axial length. Further, the housing 10 has a bottom surface that allows the charger to be placed on a desk, with the ring being in an upright position, and the bottom of the housing 10 incorporates the circuit board 12, main power supply (not shown) and other components. The inner diameter of the ring of the housing is larger than the outer diameter of the ball-shaped measurement device 2 such that the ball-shaped measurement device 2 can be positioned inside the ring of the housing 10.

Figure 3A:
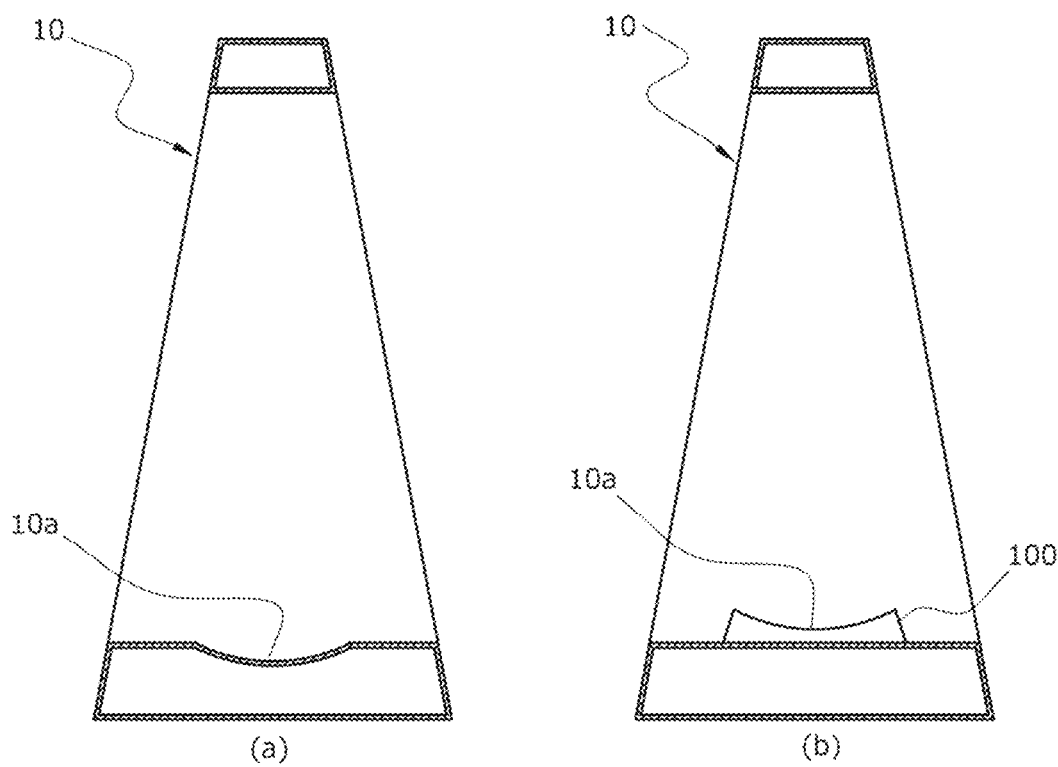
FIG. 3A shows simplified longitudinal cross-sectional views of variations of the housing of the charger.

Further, as shown in FIG. 2, the bottom of the inner periphery of the ring of the housing 10 includes a holding member 10a, constituted by an arc-shaped recess, for holding the ball-shaped measurement device 2 of the size of a regulation baseball and preventing it from rolling out of the charger. Further, according to the present embodiment, the entire inner periphery of the ring of the housing 10 constitutes a second holding member 10b for holding a second ball-shaped measurement device 2' of the size of a softball. The holding member 10a may be a recess formed on the upper surface of the bottom of the housing 10 itself, as shown in FIG. 3A(a). Alternatively, as shown in FIG. 3A(b), the upper surface of the bottom of the housing 10 may be formed to be flat and a dish-shaped member 100 may be mounted on the upper surface of the bottom, where a recess formed on the upper surface of the dish-shaped member 100 holds the ball, thereby enabling simplification of a mold for the housing 10, thus reducing costs.

As shown in FIGS. 2 and 3, the power-transmitting coil 11 is positioned relative to the holding member 10a in such a manner that the axis of the power-receiving coil 24 of the ball-shaped measurement device 2 and the axis of the power-transmitting coil 11 of the charger 1 are parallel to each other when the measurement device 2 is held by the holding member 10a in such a manner that the mark M faces toward the front. Further, the power-transmitting coil 11 is positioned relative to the holding member 10a in such a manner that the power-receiving coil 24 and power-transmitting coil 11 overlap at least partially as viewed in a radial direction. In the embodiment shown, when the measurement device 2 is held by the holding member 10a in such a manner that the mark M faces toward the front, the power-receiving coil 24 is completely contained in the axial range of the power-transmitting coil 11.

Similarly, to accommodate the second ball-shaped measurement device 2', the power-transmitting coil 11 is positioned relative to the holding member 10b in such a manner that the axis of the power-receiving coil 24' of the measurement device 2' and the axis of the power-transmitting coil 11 of the charger 1 are parallel to each other when the measurement device is held by the second holding member 10b. Moreover, the power-transmitting coil 11 is positioned relative to the holding member 10b in such a manner that the power-receiving coil 24' and the power-transmitting coil 11 overlap at least partially as viewed in a radial direction.

As shown in FIG. 5, on the circuit board 12 are mounted: a driver circuit 13 for supplying high-frequency current to the power-transmitting coil 11 to generate a magnetic flux for wireless power-feeding to the power-receiving coil 24; a voltage conversion circuit 14 for producing, for output, a power supply voltage of high-frequency current (i.e., voltage to supplied to the driver circuit 13) based on a main supply voltage (5 V); a wireless data receiver constituted by a wave detection circuit 15 for detecting a modulation signal from the measurement device 2 superimposed on the high-frequency current flowing through the power-transmitting coil 11; a control unit 16 constituted by, among other components, a microprocessor that provides various controls based on data received by the wave detection circuit 15; and a notification unit constituted by two LEDs 17a and 17b. Although not shown, it is preferable to provide a power switch.

The two LEDs 17a and 17b may emit light in different colors, where the one LED 17a may be used to indicate, for example, the level of charged power, whereas the other LED 17b may be used to indicate, for example, the degree of positional adjustment of the measurement device relative to the charger 1 (for example, how appropriate the position of the power-receiving coil 24 is relative to the power-transmitting coil 11).

In the present embodiment, the driver circuit 13 is constituted by a voltage-form half-bridge inverter, and mainly composed of arms constituted by two switching elements Q1 and Q2 and a PWM circuit 13a for providing driving signals to the switching elements Q1 and Q2 based on a control signal from the control unit 16.

In the present embodiment, the voltage conversion circuit 14 is constituted by an up/down regulator, and is capable of adjusting the output voltage based on a command from a voltage control unit constituted by, for example, a control program running on the control unit 16, from a minimum voltage lower than the main supply voltage (1 V, for example) to a maximum voltage higher than the main supply voltage (7 V, for example). Thus, the power supply voltage adjustment controller for adjusting the power supply voltage of high-frequency current to be supplied to the power-transmitting coil 11 is constituted by the voltage control unit of the control unit 16 and the up/down regulator 14. To stabilize power supply voltage, it is preferable to provide a decoupling capacitor adjacent to the output of the voltage conversion circuit 14, as shown in FIG. 5.

The wave detection circuit 15 detects load-modulation components generated in the power-transmitting coil 11 by a load-modulation operation by the wireless data transmitter of the measurement device 2, and provides the detected signal to the control unit 16. In some implementations, the detected signal may be provided to an analog input port of the control unit 16 and the control unit 16 may extract packet data from the detected signal; in other implementations, an A/D converter may be provided within the wave detection circuit 15 and the wave detection circuit 15 may generate a binary serial data to be provided to a serial input port of the control unit 16. Thus, packet data transmitted from the measurement device 2 is received by the wave detection circuit 15 and then the control unit 16.

The control unit 16 includes a voltage control unit for controlling the output voltage in the up/down regulator 14 and a notification control unit for driving and controlling the LEDs 17a and 17b, where these sub-units are realized by control programs, for example.

Based on the information relating to the required amount of power included in the packet data received from the measurement device 2, the voltage control unit controls the output voltage in the voltage conversion circuit 14 so that the circuit transmits the amount of power requested by the measurement device 2.

The notification control unit controls, i.e., changes, the flicker pattern of the LED 17a depending on the level of charge of the secondary cell 25 indicated by the packet data received from the measurement device 2. For example, the LED may be controlled to flicker at intervals of 0.5 seconds if the state of charge (SOC) is lower than 70%, flicker at intervals of 0.3 seconds if the SOC is 70 to 80%, flicker at intervals of 0.1 seconds for 80 to 90%, and be constantly on for 90% or higher, to provide the user with an easy-to-understand indication about the state of charge of the secondary cell of the measurement device 2.

Further, the notification control unit controls, i.e., changes, the flicker pattern of the LED 17b based on the information relating to the state of feed included in the packet data. For example, the smaller the ratio of the amount of power being received indicated by the packet data relative to the amount of power being transmitted calculated based on the output voltage in the voltage conversion circuit 14, the lower the flicker rate of the LED 17b is made, whereas the larger the ratio of the amount of power being received relative to the amount of power being transmitted, the higher the flicker rate of the LED 17b is made, thereby providing an easy-to-understand indication about whether power-transmission efficiency is good or not. Alternatively, the flicker rate may be varied based on the value of the amount of power being received, instead of the ratio thereof to the amount of power being transmitted. Alternatively, similar controls may be made based on the voltage generated in the power-receiving coil 24, instead of on the amount of power.

Further, the control unit 16 may be configured to selectively perform a first control mode, in which the user is notified of the state of feed by the notifier (i.e., position adjustment mode), and a second control mode, in which the secondary cell 25 of the measurement device 2 is to be fully charged (i.e., charge mode). In some implementations, such selection of a control mode may be done by an operation of a mode-selection operation unit (not shown) constituted by an operation button provided on the housing 10; in other implementations, when the control unit 16 detects, based on the information included in the packet data, that the ball-shaped measurement device 2 is placed inside the ring of the charger 1, the first control mode may be performed for a predetermined period of time (10 seconds, for example), before the second control mode is automatically performed to control the charge.

According to the present embodiment, the voltage control unit is configured to maintain the output voltage in the voltage conversion circuit at a relatively low constant voltage, for example 3 V, during the operation in the first control mode. This makes the output power transmitted from the charger 1 constant; as such, the variation in the information relating to the state of feed included in the packet data only depends on changes in the position of the power-receiving coil 24 relative to the power-transmitting coil 11, which facilitates determining which direction the power-receiving coil 24 faces relative to the power-transmitting coil 11. Accordingly, even if no mark M is provided on the outer surface of the measurement device 2, or if it is desired to check the direction of the axis of the power-receiving coil 24 during the manufacture process of the measurement device 2, performing the first control mode will enable precise determination of the direction of the axis of the power-receiving coil 24.

During the operation in the second control mode, the control unit may work together with the charging IC 261 of the measurement device 2 to control the output voltage in the voltage conversion circuit 14 to fully charge the secondary cell 25 in accordance with the above-mentioned CCCV charging profile and, when receiving from the measurement device 2 a command to stop the charge operation, terminate the power-transmission operation.

The present invention is not limited to the above-described embodiments, and may be modified in design as necessary. For example, if the measurement device 2 is shipped with a mark M provided thereon, the LED 17*b* and the first control mode for providing a notification about the state of feed are not indispensable; thus, the device may be configured to provide only a notification about the state of charge.

Figure 6:
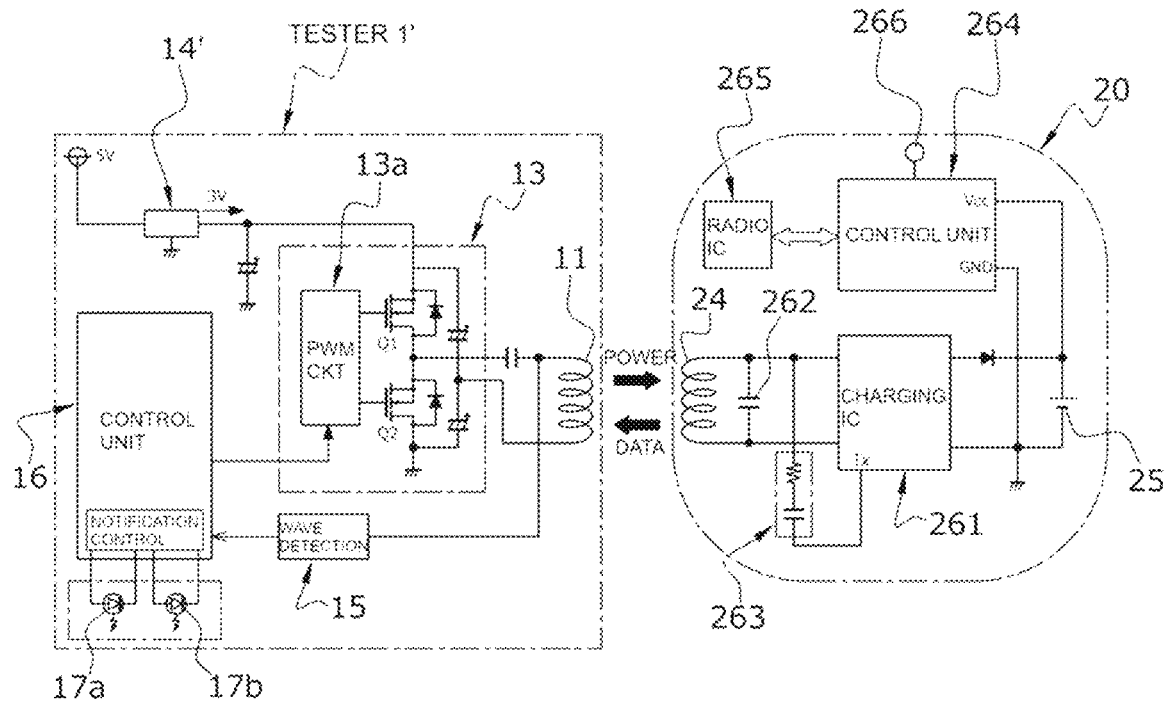
FIG. 6 is a simplified circuit diagram of a tester that constitutes a wireless power-feeding apparatus according to a second embodiment of the present invention.

Further, the present invention may be carried out in such a manner that the wireless power-feeding apparatus is a tester 1' used during the manufacturing process to check the direction of the axis of the power-receiving coil 24 embedded within the measurement device 2. In such implementations, the function of fully charging the secondary cell 25 of the measurement device 2 is unnecessary; as such, as shown in FIG. 6, the voltage conversion circuit 14' may be a three-terminal regulator that provides a constant voltage, providing a voltage lower than the maximum voltage within the voltage range required for full charging, for example a constant voltage of 3 V, to the driver circuit 13 to perform wireless feeding, and may change the flicker rate of the LED 17*b* based on the information relating to the state of feed during this time. This simplifies the apparatus configuration and reduces costs.

Further, the present invention may be carried out not only in such a manner that the wireless power-feeding apparatus is a ball-shaped measurement device 2 or 2', described in the above-illustrated embodiments, but also that the apparatus is a wireless power-feeding apparatus for various spherical power-receiving devices.

Figure 7:
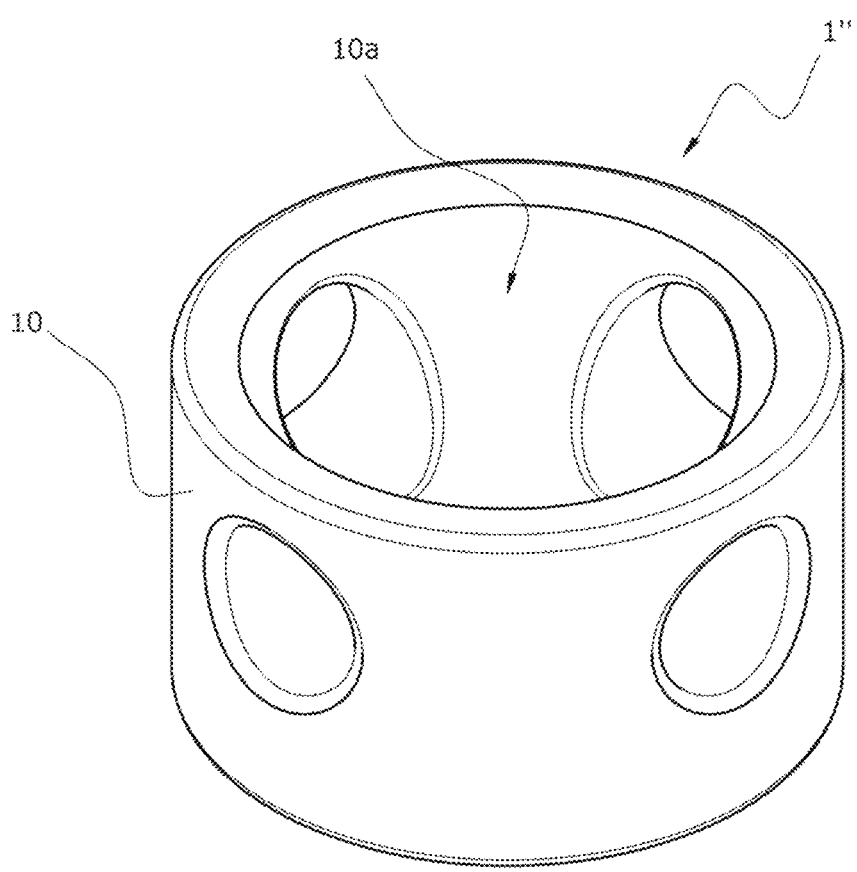
FIG. 7 is a perspective view of an entire wireless power-feeding apparatus according to a third embodiment of the present invention.
Figure 8:
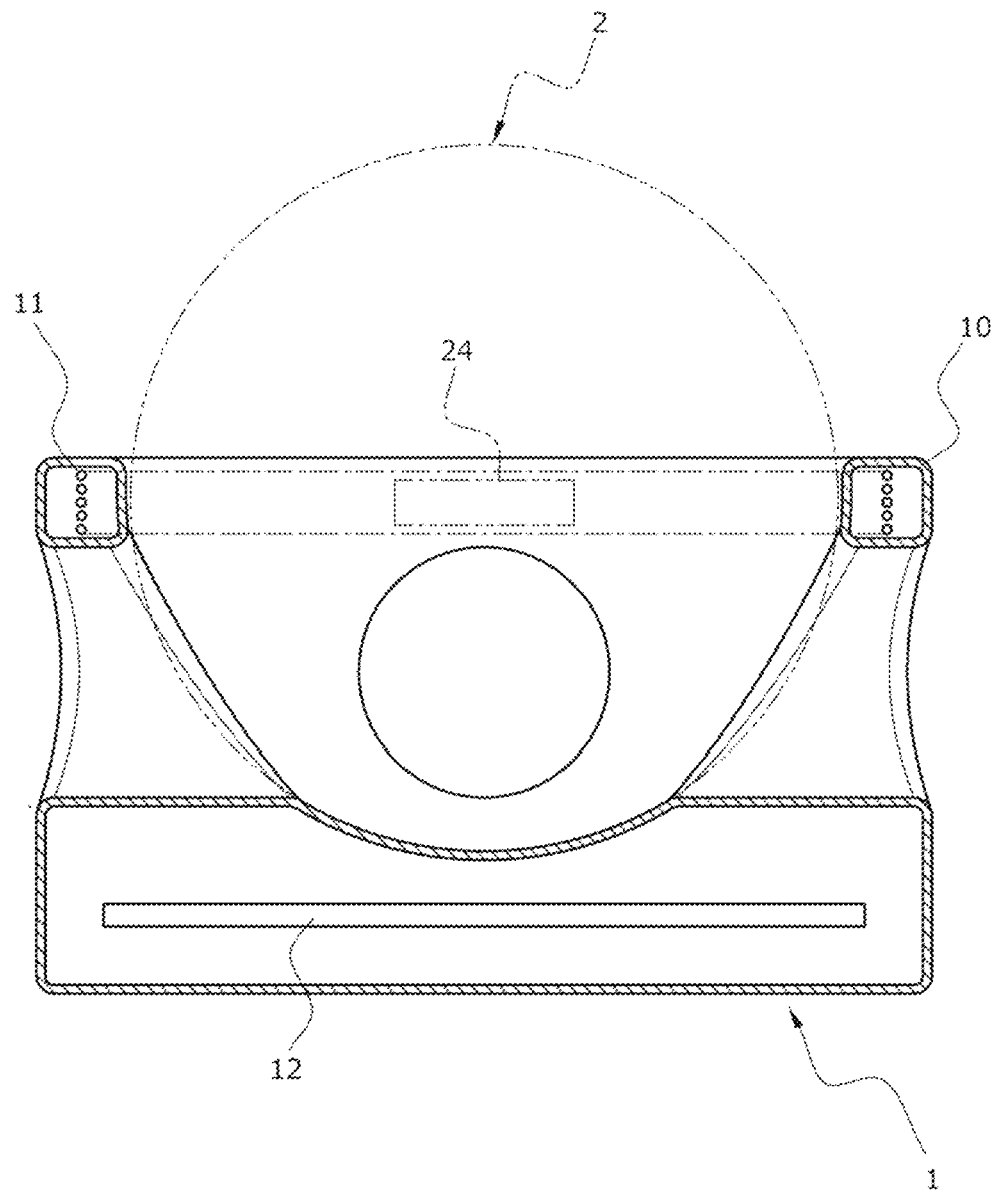
FIG. 8 is a longitudinal cross-sectional view of this wireless power-feeding apparatus.

Further, in the first embodiment shown in FIGS. 1 to 3, the wireless power-feeding apparatus 1 is configured so it can be placed on a desk with its ring being positioned upright; alternatively, as in a third embodiment shown in FIGS. 7 and 8, the housing 10 of the wireless power-feeding apparatus 1" may be shaped like a bowl. This wireless power-feeding apparatus 1" includes a housing 10 constructed such that its holding member 10*a*, constituted by a hemispherical recess, opens upward. The housing 10 incorporates a power-transmitting coil 11 located near its upper, open edge, and the axis of this coil 11 extends vertically. When a ball-shaped measurement device 2 is held by the holding member 10 of the wireless power-feeding apparatus 1" in such a manner that the mark M faces upward, the axis of the power-receiving coil 24 of the measurement device 2 and the axis of the power-transmitting coil 11 are generally parallel to each other and the power-transmitting coil 11 and the power-receiving coil 24 overlap at least partially as viewed in a radial direction.

EXPLANATION OF CHARACTERS 1, 1', 1" wireless power-feeding apparatus
11 power-transmitting coil
13 driver circuit
14 voltage conversion circuit
15 wireless data receiver
16 control unit (notifier and power supply voltage adjustment controller)
17 notification unit
2 power-receiving device
20 capsule
24 power-receiving coil
25 secondary cell
26 control board
261 charging circuit
263 load circuit constituting wireless data transmitter

The invention claimed is:

1. A wireless power-feeding apparatus for supplying electric power to a spherical power-receiving device incorporating a secondary cell, a power-receiving coil, a charging circuit and a wireless data transmitter and having a surface provided with a predetermined mark at a predetermined location relative to the power-receiving coil, the apparatus comprising:
   a holding member adapted to hold the power-receiving device;
   a power-transmitting coil;
   a driver circuit adapted to supply the power-transmitting coil with high-frequency current to generate a magnetic flux for wireless power-feeding to the power-receiving coil; and
   a wireless data receiver adapted to receive data transmitted regularly from the wireless data transmitter,
   the power-transmitting coil being positioned relative to the holding member in such a manner that axes of the power-receiving coil and the power-transmitting coil are parallel to each other when the power-receiving device is held by the holding member in such a manner that the mark on the surface of the power-receiving device faces a predetermined direction.

2. The wireless power-feeding apparatus according to claim 1,
   wherein the power-transmitting coil is a solenoid coil having a diameter larger than an outer diameter of the power-receiving device and having an axial length.

3. The wireless power-feeding apparatus according to claim 2,
   the power-receiving coil of the power-receiving device supplied with electric power by the apparatus being a solenoid coil having an axial length, and
   the power-transmitting coil being positioned relative to the holding member in such a manner that the power-receiving coil and the power-transmitting coil overlap at least partially as viewed in a radial direction when the power-receiving device is held by the holding member in such a manner that the axes of the power-receiving coil and the power-transmitting coil are parallel to each other.

4. The wireless power-feeding apparatus according to claim 1, further comprising:
   a notifier adapted to provide a predetermined notification depending on the data received by the wireless data receiver,
   the data received by the wireless data receiver including information relating to a state of feed for the power-receiving coil, the notifier being configured to change its notification depending on a change in the state of feed.

5. The wireless power-feeding apparatus according to claim 4, further comprising:
   a power supply voltage adjustment controller adapted to adjust a power supply voltage in the driver circuit, the power supply voltage adjustment controller configured to selectively perform a first control mode, in which the notifier performs a predetermined notification, and a second control mode, in which the secondary cell of the power-receiving device is to be fully charged, wherein during an operation in the second control mode, a value of the power supply voltage is changed within a predetermined range depending on a state of charge of the secondary cell, and during an operation in the first control mode, the power supply voltage is kept at a constant voltage lower than a maximum voltage of the predetermined range.

6. A wireless power-feeding system comprising:

the wireless power-feeding apparatus according to claim 1; and the power-receiving device, the power-receiving device being adapted to be used as a regulation baseball, a rubber baseball, a leather softball or a rubber softball, and the mark being a stitch on a cover of the regulation baseball or the leather softball or a stitch decoration on a surface of the rubber baseball or the rubber softball.

7. A wireless power-feeding apparatus for supplying electric power to a spherical power-receiving device incorporating a secondary cell, a power-receiving coil, a charging circuit and a wireless data transmitter, comprising:

a power-transmitting coil;

a driver circuit adapted to supply the power-transmitting coil with high-frequency current to generate a magnetic flux for wireless power-feeding to the power-receiving coil;

a wireless data receiver adapted to receive data transmitted from the wireless data transmitter;

a notifier adapted to provide a predetermined notification depending on the data received by the wireless data receiver, the data including information relating to a state of feed for the power-receiving coil, the notifier being configured to change its notification depending on a change in the state of feed; and a power supply voltage adjustment controller adapted to adjust a power supply voltage in the driver circuit, the power supply voltage adjustment controller configured to selectively perform a first control mode, in which the notifier performs a predetermined notification, and a second control mode, in which the secondary cell of the power-receiving device is to be fully charged, wherein during an operation in the second control mode, a value of the power supply voltage is changed within a predetermined range depending on a state of charge of the secondary cell, and during an operation in the first control mode, the power supply voltage is kept at a constant voltage lower than a maximum voltage of the predetermined range.

8. A wireless power-feeding apparatus for supplying electric power to a spherical power-receiving device incorporating a secondary cell, a power-receiving coil, a charging circuit and a wireless data transmitter, comprising:

a power-transmitting coil;

a driver circuit adapted to supply the power-transmitting coil with high-frequency current to generate a magnetic flux for wireless power-feeding to the power-receiving coil;

a wireless data receiver adapted to receive data transmitted from the wireless data transmitter;

a notifier adapted to provide a predetermined notification depending on the data received by the wireless data receiver, the data including information relating to a state of feed for the power-receiving coil, the notifier being configured to change its notification depending on a change in the state of feed; and a holding member adapted to hold the power-receiving device, the power-receiving device supplied with electric power by the apparatus having a surface provided with a predetermined mark at a predetermined position relative to the power-receiving coil, and the power-transmitting coil being positioned relative to the holding member in such a manner that axes of the power-receiving coil and the power-transmitting coil are parallel to each other when the power-receiving device is held by the holding member in such a manner that the mark on the surface of the power-receiving device faces a predetermined direction.

9. A wireless power-feeding apparatus for supplying electric power to a spherical power-receiving device incorporating a secondary cell, a power-receiving coil, a charging circuit and a wireless data transmitter, comprising:

a power-transmitting coil;

a driver circuit adapted to supply the power-transmitting coil with high-frequency current to generate a magnetic flux for wireless power-feeding to the power-receiving coil;

a wireless data receiver adapted to receive data transmitted from the wireless data transmitter; and a notifier adapted to provide a predetermined notification depending on the data received by the wireless data receiver, the data including information relating to a state of feed for the power-receiving coil, the notifier being configured to change its notification depending on a change in the state of feed, the power-transmitting coil being a solenoid coil having a diameter larger than an outer diameter of the power-receiving device and having an axial length.

10. The wireless power-feeding apparatus according to claim 9, further comprising:

a holding member adapted to hold the power-receiving device, the power-receiving coil of the power-receiving device supplied with electric power by the apparatus being a solenoid coil having an axial length, and the power-transmitting coil being positioned relative to the holding member in such a manner that the power-receiving coil and the power-transmitting coil overlap at least partially as viewed in a radial direction when the power-receiving device is held by the holding member in such a manner that axes of the power-receiving coil and the power-transmitting coil are parallel to each other.

* * * * *